US009026706B2

United States Patent
Channagiri Nagendra et al.

(10) Patent No.: US 9,026,706 B2
(45) Date of Patent: May 5, 2015

(54) METHOD AND SYSTEM FOR DETECTING MULTIPLE EXPANDERS IN AN SAS TOPOLOGY HAVING THE SAME ADDRESS

(71) Applicant: LSI Corporation, Milpitas, CA (US)

(72) Inventors: Raghavendra Channagiri Nagendra, Bangalore (IN); Giridhar Danayakanakeri, Milpitas, CA (US); Prashant Prakash Yendigiri, Bangalore (IN)

(73) Assignee: LSI Corporation, Milpitas, CA (US)

( * ) Notice: Subject to any disclaimer, the term of this patent is extended or adjusted under 35 U.S.C. 154(b) by 362 days.

(21) Appl. No.: 13/715,103

(22) Filed: Dec. 14, 2012

(65) Prior Publication Data

US 2014/0173153 A1    Jun. 19, 2014

(51) Int. Cl.
G06F 13/40    (2006.01)
(52) U.S. Cl.
CPC .................. G06F 13/4063 (2013.01)
(58) Field of Classification Search
CPC .................................. G06F 13/4063
USPC ............................. 710/8–10, 104
See application file for complete search history.

(56) References Cited

U.S. PATENT DOCUMENTS

| | | | |
|---|---|---|---|
| 7,401,171 B2 * | 7/2008 | Slutz et al. | 710/104 |
| 7,849,248 B2 | 12/2010 | Johnson et al. | |
| 8,077,605 B2 | 12/2011 | McCarty et al. | |
| 2008/0028107 A1 * | 1/2008 | Cherian et al. | 710/9 |
| 2009/0037638 A1 * | 2/2009 | Izuta et al. | 710/316 |
| 2012/0144082 A1 | 6/2012 | Romero et al. | |
| 2012/0173840 A1 | 7/2012 | Patel et al. | |
| 2013/0304952 A1 * | 11/2013 | Aggarwal et al. | 710/104 |

OTHER PUBLICATIONS

Fairchild, S., "SAS Expander Initiator Based Configuration," HP, Jul. 12, 2002, 33 pages.

* cited by examiner

Primary Examiner — Glenn A Auve
(74) Attorney, Agent, or Firm — Duft Bornsen & Fettig LLP

(57) ABSTRACT

Methods, systems, and processor-readable media are disclosed for detecting multiple expanders in a SAS topology having the same address. A root expander can be connected to a plurality of expanders, wherein one or more expanders among the plurality of expanders possesses a same SAS address as the root expander. The same SAS address can be identified and stored in a route table against a physical layer identifier through which the expander(s) communicate with the root expander in order to assist in identifying duplicate expanders in the SAS topology.

14 Claims, 2 Drawing Sheets

METHOD AND SYSTEM FOR DETECTING MULTIPLE EXPANDERS IN AN SAS TOPOLOGY HAVING THE SAME ADDRESS

FIELD OF THE INVENTION

Embodiments are generally related to SAS (Serial Attached SCSI) components, devices, and systems. Embodiments also relate to the development and implementation of SAS topologies.

BACKGROUND

Serial Attached SCSI (SAS) is a term referring to various technologies designed to implement data transfer between computer devices. The SAS protocol is a serial successor to the parallel Small Computer System Interface. In the SAS protocol, all SAS devices are either an initiator device, a target device, or an expander device. Initiator devices are devices that begin a SAS data transfer, while target devices are the devices to which initiator devices transfer data. Together, initiator devices and target devices are also known in some cases as end devices.

SAS expanders are devices that facilitate data transfer between multiple initiator devices and multiple target devices. The SAS protocol utilizes a point-to-point bus topology. Therefore, if an initiator device is required to connect to multiple target devices, a direct connection must be made between the initiator device and each individual target device in order to facilitate each individual data transfer between the initiator device and each individual target device. SAS expanders manage the connections and data transfer between multiple initiator devices and multiple target devices. SAS expanders may contain SAS devices.

FIG. 1 illustrates a representative SAS system 10 that can serve to explain how the "discovery" process is currently implemented. In general, SAS system (e.g., SAS topology) includes a controller 12 that communicates bi-directionally with an expander 14 (also labeled Expander A in FIG. 1). Expanders 16, 18, and 20 (respectively, expanders D, C, and B) are also shown in FIG. 1 with respect to expander 14 and SAS Disks 22-32. The controller 12 can be a SMP initiator. The controller 12 is thus connected to expander A, which constitutes the root expander in the topology. Expander A is connected to 3 more expanders namely expanders B, C, and D. Additionally, two SAS disks 34, 36 can be connected to expander 14.

Let us assume that a physical layer ("phy") with a lowest phy identifier at each device is at the left top portion of the configuration shown in FIG. 1 and remaining phys have increasing phy identifiers assigned in a counter clockwise direction. All the expanders are self-configuring expanders (i.e., expanders which perform discovery on their own and configure their routing table). Please refer to SAS specification sas2r16 For more details about the self configuring expander, it is suggested to refer to the SAS Specification, Working Draft American National Standard, Information Technology—Serial Attached SCSI-2 (SAS-2), Project T10/1760-D, Revision 16, Apr. 18, 2009, which is incorporated herein by reference in its entirety.

When the entire topology (e.g., system 10) is powered up, each expander begins discovery beginning from its own phys. We can consider a discovery process carried by Root expander (e.g., Expander A). The lowest phy identifier can be connected to the controller 12 so that in an expander route table, an end device is stored for the first phy identifier along with its SAS address and supported protocol information.

Similarly, expander A finds that 2 SAS disks are connected to next two phys and hence, in its expander route table stores as end devices connected to these two phys along with other information. On fourth phy root expander finds another expander i.e. expander B so root expander stores that an expander device connected against fourth phy. Similarly, expanders C and D can be detected one after the other and for corresponding phys in Expander A's route table an entry is made indicating connection to these expanders.

After the completion of discovery on all of its phys, the root expander begins discovery on devices which are of 'expander' type (i.e., expanders B, C, and D). The same discovery process is followed as explained above and all SAS disks 22 through 32 are discovered and entries are made in route table of root expander A. In current implementations during discovery of the topology, if multiple expanders possess the same SAS address, then neither expanders nor controllers would perform discovery on such duplicate expanders and notify the user of such expanders in the topology. Hence, all the devices connected to such duplicate expanders along with duplicate expanders will not be part SAS topology at the end of discovery and user will not be able to identify the position of such devices and expanders to subsequently modify the SAS addresses.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved SAS topology.

It is another aspect of the disclosed embodiments to provide for an improved method and system for identifying expanders in a SAS topology having the same SAS address.

The aforementioned aspects and other objectives and advantages can now be achieved as described herein. Methods, systems, and processor-readable media are disclosed for detecting multiple expanders in a SAS topology having the same address. A root expander can be connected to a plurality of expanders, wherein one or more expanders among the plurality of expanders possess a same SAS address as the root expander. The same SAS address can be identified and stored in a route table against a physical layer identifier through which the expander(s) communicate with the root expander in order to assist in identifying duplicate expanders in the SAS topology.

In some embodiments, the expanders can include peer expanders. In other embodiments, a step or logical operation can be provided for modifying a SAS address associated with one or more of the expanders, if the SAS address comprises the same address as the root expander. In yet another embodiment, the root expander can be connected to at least one SAS disk among a plurality of SAS disks. In still another embodiment, the plurality of expanders can include at least one expander upstream, which generates a new SAS address based on an identifier associated with the physical layer. Additionally, steps or logical operations can be provided for detecting the new SAS address and transmitting the new SAS address to at least one of the duplicate expanders in the SAS topology. In other embodiments, a step or logical operation can be implemented for initiating a discover process via the root expander.

In another embodiment, a system for detecting multiple expanders in a SAS topology having the same address can be implemented. Such a system can include, for example, a processor; a data bus coupled to the processor; and a computer-usable medium embodying computer program code, the computer-usable medium being coupled to the data bus. Such computer program code can include instructions executable by the processor and configured for, for example, connecting a root expander to a plurality of expanders, wherein at least one expander among the plurality of expanders possesses a same SAS address as the root expander; identifying the same SAS address; and storing the SAS address in a route table against a physical layer identifier through which the expander(s) communicate with the root expander in order to assist in identifying duplicate expanders in the SAS topology.

In other embodiments, the plurality of expanders can include peer expanders. In yet other embodiments, such instructions can be further configured for modifying a SAS address associated with the expander(s), if the SAS address comprises the same address as the root expander. In some embodiments, the root expander can be connected to one or more SAS disks among a plurality of SAS disks. In another embodiment, the plurality of expanders can include one or more expanders upstream, which can generate a new SAS address based on an identifier associated with the physical layer. In still other embodiments, such instructions can be further configured for detecting the new SAS address and transmitting the new SAS address to at least one of the duplicate expanders in the SAS topology. In another embodiment, such instructions can be further configured for initiating a discover process via the root expander.

In another embodiment, a processor-readable medium storing code representing instructions to cause a process for detecting multiple expanders in a SAS topology having the same address can be implemented. Such code can include code to, for example, connect a root expander to a plurality of expanders, wherein at least one expander among the plurality of expanders possesses a same SAS address as the root expander; identify the same SAS address; and store the SAS address in a route table against a physical layer identifier through which the expander(s) communicate with the root expander in order to assist in identifying duplicate expanders in the SAS topology.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. Other embodiments of the invention will become apparent.

DETAILED DESCRIPTION

Figure 1:
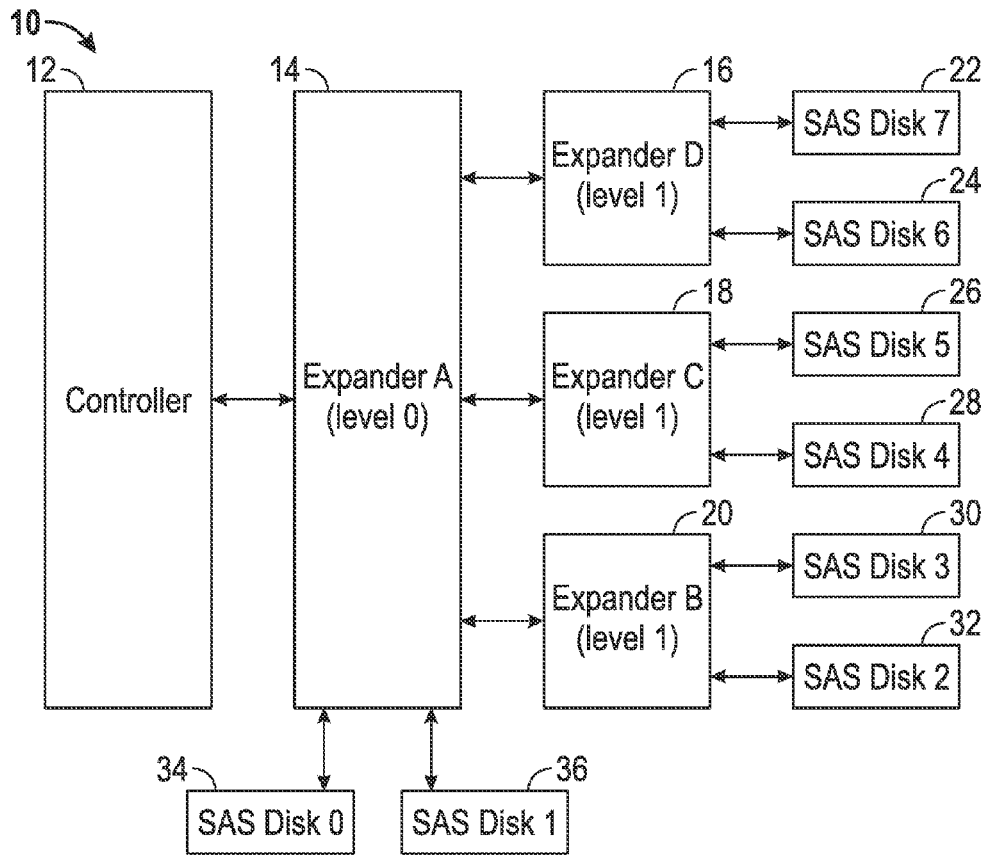
FIG. 1 illustrates a block diagram of a SAS system in accordance with the a preferred embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Thus, for example, although different embodiments are described with respect to different features and components and varying figures, each figure can relate to the prior figure or next figure as part of an overall description of the present invention. Similarly, similar or identical parts or components may be indicated by the same reference numeral or identifier in different figures (e.g., expanders A, B, C, etc.).

Before proceeding with a detailed analysis of the disclosed embodiments, it is important to appreciate that in SAS topology, if there is more than one expander with the same SAS address, only one expander is detected as part of the topology. All other expanders with the same SAS address and devices downstream to those expanders are not visible in the topology. If the topology is dense and multiple expanders possess the same SAS address somewhere inside dense topology, then there is no way to determine if there is another expander having the same SAS address and to find out the exact location of duplicate expanders within the topology.

The disclosed embodiments resolve this issue with the implementation of a unique method and system for detecting the presence of multiple expanders with the same SAS address and a way to alter the SAS addresses of these expanders at run time using, for example, Vendor Unique SMP commands. This approach completely avoids the possibility of expanders, and devices connected to these expanders, missing due to multiple devices potentially having the same address.

Figure 2:
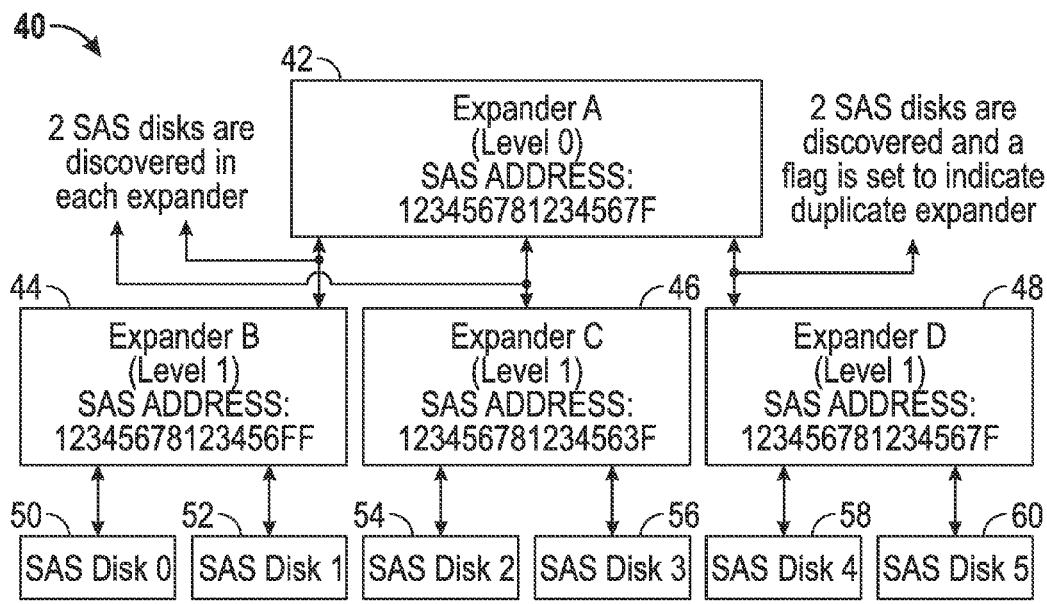
FIG. 2 illustrates a block diagram of a SAS system, in accordance with an alternative embodiment.

FIG. 2 illustrates a block diagram of a SAS system 10 or topology in accordance with the preferred embodiment. SAS system 10 (e.g., SAS topology) generally includes an expander 42 (expander A) that communicates with and/or is generally connected to expanders 44, 46, and 48 (respectively, expanders B, C, and D). SAS disks 50, 52 are connected to expander 44. SAS disks 54, 56 are connected to expander C. SAS disks 58, 56 are connected to expander 48.

With the approach described herein, both controllers and expanders can easily identify the presence and exact location of duplicate expanders and also easily modify the SAS addresses of such expanders dynamically. With this new technique all the duplicate expanders and devices connected to these expanders can be identified during discovery and thus become part of the SAS topology. The same technique applies to SAS topologies having any level of depth.

Thus, in one scenario a duplicate expander can be directly connected to the root expander. FIG. 2 demonstrates a topology which includes a root expander provided by expander 42 (i.e., Expander A) and the expanders 44, 46, and 48 (respectively, expanders B, C, and D) as child expanders directly connected to the root expander. Each of the child expanders has 2 SAS disks connected to them. Expanders A and D have the same SAS address. Let us assume that a phy with a lowest phy identifier at each device is at the top right of the configuration depicted in FIG. 2, and remaining phys have increasing phy identifiers assigned in a counter clockwise direction.

The root expander A begins the discovery. Expander B is identified first with its SAS address, device type, and supported protocol information being shared with the root expander. The root expander stores this information in its Route table against the phy identifier through which expander B is detected. Similarly, expander C can be detected and its information is stored in the route table against the phy identifier through which expander C is detected.

Filially discovery for expander D begins and the root expander A determines that expander D has the same SAS address as its own. When the expander finds its own SAS address as a destination SAS address, there are two possibilities. First, the root expander may be physically connected back to itself and hence both source and destination SAS address remains same. The other possibility is that a different expander has the same SAS address as that of the root expander and is also connected to the root expander.

In prior art implementations, the expander logs error and stops self-discovery and hence topology discovery. The firmware halts after few retries as it cannot work without complete discovery.

The disclosed embodiments, on the other hand, explain how to detect duplicate expanders and modify their SAS address subsequently. When the root expander finds that the destination SAS address is the same as its own SAS address on one of its own phys, while traversing through all of its phys one by one, it considers such a SAS address just like other SAS addresses and stores it in a root expander table with a flag set in the route table which indicates the presence of the same SAS address multiple times. It continues discovering devices connected to other phys and finishes discovery on all of its phys.

The root expander can now begin discovery with respect to each of the expanders by referring to its routing table. Expander B, for example, can be identified first so that the discovery process begins on this expander and two SAS disks are detected and a route table configured with device specific information of these devices against expander B. The same process can continue for expander C and two more disks are detected and corresponding device information is stored in the Root expander route table against expander C. Discovery then begins for expander D, two disks are identified and device specific information is stored in the Root expander route table against expander D.

Discovery is complete with all the devices being identified. However, the route table can have a flag set against expander D due to the presence of the same SAS address which matches with the root expander as shown in FIG. 2. Now in order to determine if expander D is the root expander itself or another expander with same the SAS address, the topology information can be compared against the root expander and expander D. The topology information associated with the root expander has three expanders and six SAS disks. The topology information associated with expander D, however, only possesses two SAS disks and one expander. Therefore in such a situation, the comparison does not match and it can be assumed that expanders A and D are different and hence one of these expanders' SAS addresses will need to be changed.

If, however, the comparison matches, then this indicates that same expander is physically connected back and hence the phys against which the root expander detected itself will be disabled.

Figure 3:
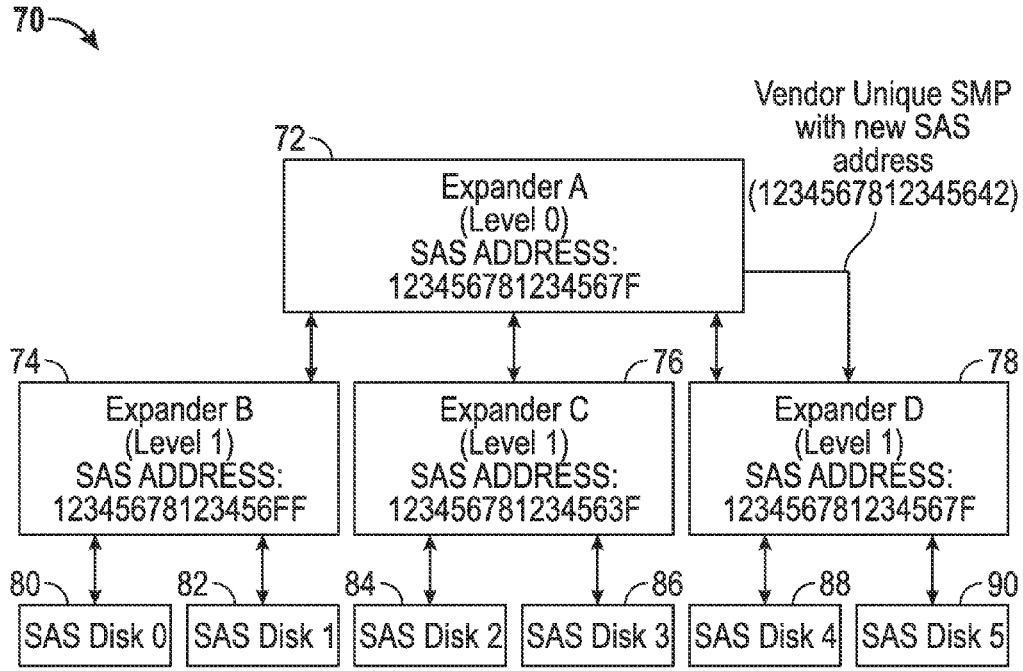
FIG. 3 illustrates a SAS system, which can be implemented in accordance with an alternative embodiment.

FIG. 3 Illustrates a SAS system 70, which can be implemented in accordance with an alternative embodiment. The SAS topology or system 70 includes an expander 72 (i.e., expander A) connected to three expanders 74, 76, 78 (respectively, expanders B, C, and D). Expander 74 is connected to SAS disks 80, 82, and expander 76 is connected to SAS disks 84, 86. Expander 78 is connected to SAS disks 88, 90, In general, once it is determined that there are actually two different expanders with same the SAS address present in the topology, the expander which is comparatively upstream can generate a new SAS address based on the phy identifier through which other expanders can duplicate the SAS address that was detected. This new SAS address can be sent to the duplicate expander in a vendor unique SMP command as shown in FIG. 3.

After receiving this command, the duplicate expander can change its SAS address as recommended in the SMP command and undergo a reset. When it comes back from reset, the root expander begins the discovery again and finds that all devices have unique SAS address as shown in FIG. 4.

Figure 4:
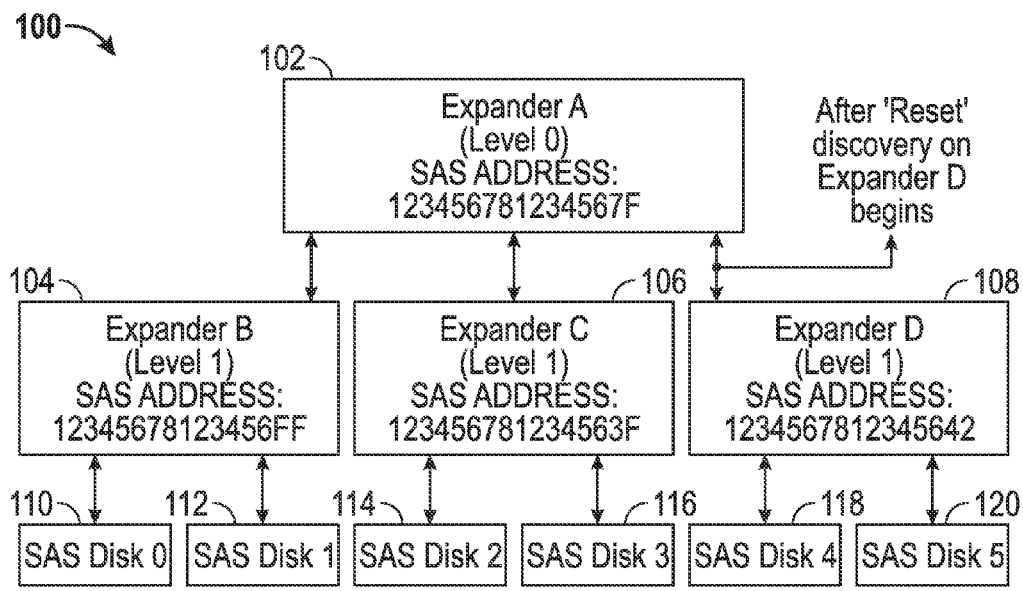
FIG. 4 illustrates a SAS system, in accordance with an alternative embodiment.

FIG. 4 illustrates a SAS system 100, in accordance with an alternative embodiment. SAS topology or system 100 generally includes an expander 102 (expander A) connected to expanders 104, 106, 108 (respectively, expanders B, C, and D). Expander 104 is generally connected to SAS disks 110, 112 and expander C is connected to SAS disks 114, 116. Expander 108 is connected to SAS disks 118, 120.

Based on the foregoing. It can be appreciated that a number of embodiments, preferred and alternative, are disclosed herein. For example, in one embodiment, a method can be implemented for detecting multiple expanders in a SAS topology having the same address. Such a method can include the steps or logical operations of providing a root expander connected to a plurality of expanders, wherein at least one expander among the plurality of expanders possesses a same SAS address as the root expander; identifying the same SAS address; and storing the SAS address in a route table against a physical layer identifier through which the expander(s) communicate with the root expander in order to assist in identifying duplicate expanders in the SAS topology.

In some embodiments, the plurality of expanders can include peer expanders. In other embodiments, a step or logical operation can be provided for modifying a SAS address associated with one or more of the expanders, if the SAS address comprises the same address as the root expander. In yet another embodiment, the root expander can be connected to at least one SAS disk among a plurality of SAS disks. In still another embodiment, the plurality of expanders can include at least one expander upstream, which generates a new SAS address based on an identifier associated with the physical layer. Additionally, steps or logical operations can be provided for detecting the new SAS address and transmitting the new SAS address to at least one of the duplicate expanders in the SAS topology. In other embodiments, a step or logical operation can be implemented for initiating a discover process via the root expander.

In another embodiment, a system for detecting multiple expanders in a SAS topology having the same address can be implemented. Such a system can include, for example, a processor; a data bus coupled to the processor; and a computer-usable medium embodying computer program code, the computer-usable medium being coupled to the data bus. Such computer program code can include instructions executable by the processor and configured for, for example, connecting a root expander to a plurality of expanders, wherein at least one expander among the plurality of expanders possesses a same SAS address as the root expander; identifying the same SAS address; and storing the SAS address in a route table against a physical layer identifier through which the expander(s) communicate with the root expander in order to assist in identifying duplicate expanders in the SAS topology.

In other embodiments, the plurality of expanders can include peer expanders. In yet other embodiments, such instructions can be further configured for modifying a SAS address associated with the expander(s), if the SAS address comprises the same address as the root expander. In some embodiments, the root expander can be connected to one or more SAS disks among a plurality of SAS disks. In another embodiment, the plurality of expanders can include one or more expanders upstream, which can generate a new SAS address based on an identifier associated with the physical layer. In still other embodiments, such instructions can be further configured for detecting the new SAS address and transmitting the new SAS address to at least one of the duplicate expanders in the SAS topology. In another embodiment, such instructions can be further configured for initiating a discover process via the root expander.

In another embodiment, a processor-readable medium storing code representing instructions to cause a process for detecting multiple expanders in a SAS topology having the same address can be implemented. Such code can include code to, for example, connect a root expander to a plurality of expanders, wherein at least one expander among the plurality of expanders possesses a same SAS address as the root expander; identify the same SAS address; and store the SAS address in a route table against a physical layer identifier through which the expander(s) communicate with the root expander in order to assist in identifying duplicate expanders in the SAS topology.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for detecting multiple expanders in a SAS topology having the same address: said method comprising:
   providing a root expander connected to a plurality of expanders, wherein at least one expander among said plurality of expanders possesses a same SAS address as said root expander;
   identifying said same SAS address for said at least one expander; and
   storing the SAS address of said at least one SAS expander in a route table with a physical layer identifier through which said at least one expander communicates with said root expander in order to assist in identifying duplicate expanders in said SAS topology.

2. The method of claim 1 wherein said plurality of expanders comprises peer expanders.

3. The method of claim 1 further comprising modifying an SAS address associated with said at least one expander, if said SAS address comprises said same address as said root expander.

4. The method of clam 1 wherein said root expander is connected to at least one SAS disk among a plurality of SAS disks.

5. The method of claim 1 further comprising initiating a discover process via said root expander.

6. A system for detecting multiple expanders in a SAS topology having the same address, said system comprising:
   a processor;
   a data bus coupled to said processor; and
   a non-transitory computer-usable medium embodying computer program code, said computer-usable medium being coupled to said data bus, said computer program code comprising instructions executable by said processor and configured for:
   connecting a root expander to a plurality of expanders, wherein at least one expander among said plurality of expanders possesses a same SAS address as said root expander;
   identifying said same SAS address for said at least one expander; and
   storing the SAS address of said at least one SAS expander in a route table with a physical layer identifier through which said at least one expander communicates with said root expander in order to assist in identifying duplicate expanders in said SAS topology.

7. The system of claim 6 wherein said plurality of expanders comprises peer expanders.

8. The system of claim 6 wherein said instructions are further configured for modifying a SAS address associated with said at least one expander, if said SAS address comprises said same address as said root expander.

9. The system of claim 6 wherein said root expander is connected to at least one SAS disk among a plurality of SAS disks.

10. The system of claim 6 wherein said instructions are further configured for initiating a discover process via said root expander.

11. A Serial Attached Small Computer System Interface (SAS) domain comprising:
    a first SAS expander; and
    a second SAS expander communicatively coupled to the first SAS expander via a physical layer interface (PHY) of the first SAS expander,
    wherein the second SAS expander is downstream from a host system and the first SAS expander,
    wherein the first SAS expander is operable to discover the second SAS expander, to determine that the second SAS expander has a same SAS address as the first SAS expander, to flag the SAS address of the second SAS expander with a PHY identifier of the PHY of the first SAS expander to distinguish the SAS address of the second SAS expander from the SAS address of the first SAS expander, and to update a routing table with the flagged SAS address of the second SAS expander.

12. The SAS domain of claim 11, wherein:
    the first SAS expander is further operable to generate a new SAS address for the second SAS expander based on the PHY identifier, to direct the second SAS expander to change its SAS address to the new SAS address, and to reset the second SAS expander to establish the new SAS address in the second SAS expander.

13. The SAS domain of claim 11, further comprising:
    a third SAS expander communicatively coupled to a PHY of the second SAS expander and downstream from the second SAS expander,
    wherein the third SAS expander has the same SAS address of the first and second SAS expanders, wherein the first SAS expander is further operable to discover the third SAS expander, to determine that the third SAS expander has the same SAS address as the first SAS expander, to flag the SAS address of the third SAS expander with a PHY identifier of the PHY of the second SAS expander to distinguish the SAS address of the third SAS expander from the SAS addresses of the first and second SAS expanders, and to update the routing table with the flagged SAS address of the third SAS expander.

14. The SAS domain of claim 11, further comprising:
a third SAS expander communicatively coupled to a PHY of the second SAS expander and downstream from the second SAS expander,
wherein the third SAS expander has the same SAS address of the first and second SAS expanders,
wherein the first SAS expander is further operable to discover the third SAS expander, to determine that the third SAS expander has the same SAS address as the first SAS expander, to direct the third SAS expander to change its SAS address, to reset the third SAS expander to establish the changed SAS address in the third SAS expander, and to update the routing table with the changed SAS address of the third SAS expander.

\* \* \* \* \*